(12) United States Patent
Mäkelä

(10) Patent No.: US 7,477,967 B2
(45) Date of Patent: Jan. 13, 2009

(54) METHOD FOR AUTOMATICALLY GUIDING A MINING MACHINE

(75) Inventor: Hannu Mäkelä, Helsinki (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 11/232,960

(22) Filed: Sep. 23, 2005

(65) Prior Publication Data

US 2006/0069472 A1      Mar. 30, 2006

(51) Int. Cl.
    *G05D 1/00*      (2006.01)
(52) U.S. Cl. ............... 701/23; 701/25; 701/200; 701/205; 701/50; 318/587; 180/167
(58) Field of Classification Search ............... 701/23, 701/25, 200, 205, 50; 318/587; 180/167
    See application file for complete search history.

(56) References Cited

U.S. PATENT DOCUMENTS

| | | | |
|---|---|---|---|
| 5,170,352 A | 12/1992 | McTamaney et al. | 364/424 |
| 5,572,428 A | 11/1996 | Ishida et al. | 364/461 |
| 5,615,116 A * | 3/1997 | Gudat et al. | 701/23 |
| 5,752,207 A * | 5/1998 | Sarangapani | 701/26 |
| 5,999,865 A | 12/1999 | Bloomquist et al. | 701/25 |
| 6,163,745 A * | 12/2000 | Purchase et al. | 701/23 |
| 6,304,818 B1 | 10/2001 | Kamiya | 701/200 |

FOREIGN PATENT DOCUMENTS

| | | |
|---|---|---|
| EP | 1 176 393 | 1/2002 |
| EP | 1176393 A2 * | 1/2002 |
| WO | 02/30792 | 4/2002 |

\* cited by examiner

*Primary Examiner*—Khoi H. Tran
*Assistant Examiner*—Marie A Weiskopf
(74) *Attorney, Agent, or Firm*—Drinker Biddle & Reath LLP

(57) ABSTRACT

A method for automatically controlling a mining machine. In the method a route is determined for a mining machine (14) in the form of successive, interconnected segments in a coordinate system fixed in a relation to the mine, the segments in turn being determined as successive points located at a distance from one another. The location of each point is determined in the coordinate system fixed in relation to the mine and the data associated with the points is sent wirelessly (17) to the mining machine.

9 Claims, 5 Drawing Sheets

METHOD FOR AUTOMATICALLY GUIDING A MINING MACHINE

BACKGROUND OF THE INVENTION

The invention relates to a method for automatically guiding a mining machine, preferably an unmanned mining machine, in which method a route is determined for a mining machine that is to perform a task, the route being determined in a coordinate system fixed to the mine.

When unmanned mining machines are used, it is necessary that they can be guided along a specific route reliably and safely. A problem encountered here is that the route should be determined with sufficient precision. A further problem is that as the operation continues and situations change, it must be possible to re-determine the routes of the vehicle in a precise and reliable manner.

It is known per se to use different systems and methods to guide vehicles to travel automatically, without a driver. Such prior art solutions employ either control cables embedded in the underlying surface or separate control signs or location detectors, which can be used for wired or wireless control of the position and movement of the vehicles. It is also known to use a wireless control system based on satellite navigation for controlling an automatically moving vehicle.

The use of solutions based on control cables is problematic in mines because the laying of control cables to mining tunnel floors is extremely expensive and the rubble carried in mines may damage the cables as vehicles cross the cable lines. Further, it is not conceivable to lay cables to new, continuously extending mining areas. As regards systems based on satellite positioning, they do not function in mines and are therefore inapplicable there.

BRIEF DESCRIPTION OF THE INVENTION

It is an object of the invention to provide a method and equipment allowing a route of a mining machine and the operation of the machine at different points on the route to be determined in a flexible and reliable manner.

The method of the invention is characterized in that the route is determined in the coordinate system as interconnected segments representing the route, that each segment is determined as successive points located at a distance from one another, that at least the location of each point in the coordinate system is determined, and that the information relating to the route is transmitted preferably wirelessly from the control system of the mine to the control equipment of the mining machine, the control equipment of the mining machine then guiding the machine to complete the route determined by the segments.

A basic idea of the invention is that the routes needed by unmanned, automatically operating mining machines for accomplishing their tasks are determined as interconnected route portions, or segments, each of which is provided with a specific identifier code. When desired, limit values for driving speeds and other functions can then be determined for each segment according to the segment characteristics. These variables may even be determined mining-machine-specifically, taking into account the characteristics of each mining machine. To guide a mining machine to travel from one particular location to another and, correspondingly, to carry out a specific task, the control system of the mine sends the mining machine a list of the segments of which one has a route point that is closest to the current location of the machine. Further, segment information indicating the end point of the route is given. The stored segment-specific data include the route points of the segment, with the associated location data, and any point-specific control data, such as direction, speed, actuator positions, etc. Advantageously segment-specific data, which in its simplest form mean the coordinates of the route points of each segment and the segment identifier code, are stored in advance in the memory of the control equipment of the mining machine, whereby the simplest way to determine a route is to send a list of the route segment identifier codes relating to the task. On the basis of these data the control equipment of the mining machine is then capable of calculating the required route and to use other control parameters stored in the memory of the control equipment, such as a driving speed corresponding to a curvature radius, etc. to guide the mining machine along the route required in the task.

An advantage of the invention is that it provides a simple and convenient means for assigning tasks to an unmanned mining machine operating automatically according to control commands and for providing it with the necessary route data. A further advantage is that since the routes are all determined as segments, the moving of the mining machines and their operation can be easily controlled using the data already stored.

An essential idea of a preferred embodiment of the invention is that by using approximation of new points on portions between route points of a segment, the number of points to be stored and thus the total amount of data to be stored in relation to the segments does not become too high.

BRIEF DESCRIPTION OF THE DRAWINGS

The invention will be disclosed in greater detail in connection with the following drawings, in which.

For the sake clarity the invention shown in the Figures has been simplified. Like parts are indicated with like reference numerals.

DETAILED DESCRIPTION OF THE INVENTION

Figure 1:
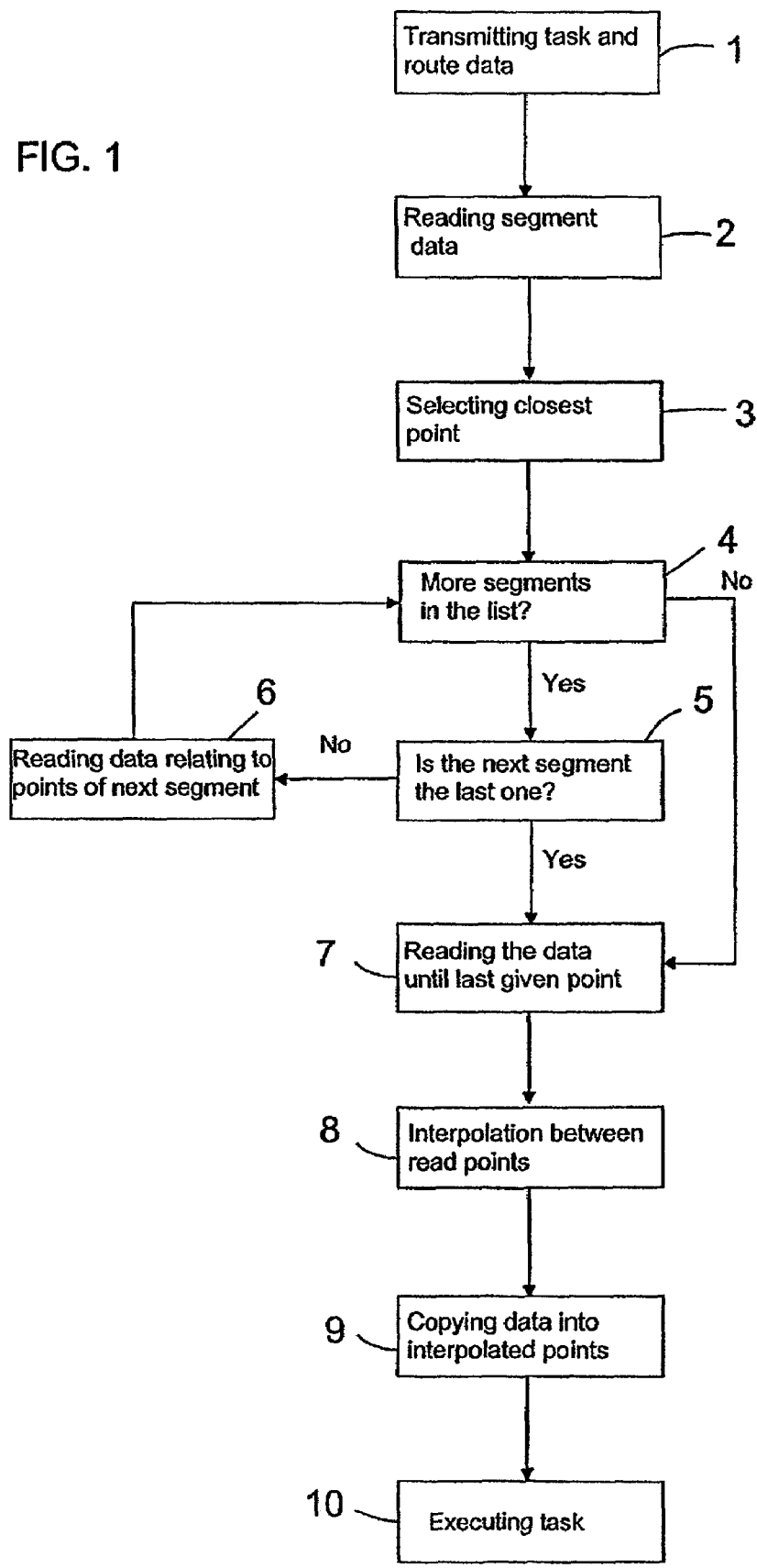
FIG. 1 is a schematic flow diagram illustrating a method of the invention.

FIG. 1 is a schematic flow diagram illustrating a method of the invention for controlling an unmanned, automatically moving mining machine. First a control system sends a route specification relating to a new task to the machine, the specification including identifier data of the route segments. Since the route point coordinates of each segment and other parameters that may be needed or wanted have been stored in advance in the memory of the control equipment, the control equipment of the mining machine is capable of guiding the mining machine by using the segment coordinates to determine travel direction, route curvature, which is determined over a plural number of route points, guide angles, and, when necessary, maximum speed adjusted to the curvature. For example, if there is a route portion that has not been used before, more detailed data relating to the segments may be sent by adding to the identifier data information about route points and their coordinates, with any associated characteristics that may have been determined, such as the maximum allowed speed, etc. This takes place in step 1 of the flow diagram. In step 2 the control system of the mining machine stores in its memory the route segment data received in the message from the control system of the mine. In step 3 the mining machine starts to execute its task at its current location by searching the route file provided by the control system for the closest starting point of a segment belonging to the route. In step 4 the control system of the mining machine checks whether the message sent by the control system of the mine contains more segment data. If the data stored in the memory has another segment, in continuation of the starting segment, the control system of the mining machine checks in step 5 whether the segment is the last one of the segments received in the message. If it is not, which is most often the case, the control system of the machine reads in step 6 the points and the associated data determining the segment in question. The routine then returns to step 4 of the flow diagram to check whether there are more segments in the list. The routine is repeated through steps 5 and 6 back to step 4 until there are no segments left in the list. If it is detected in step 5 that the next segment is the last one, or in step 4 that there are no more segments in the list, the routine proceeds to step 7, i.e. the points in the route specification of the last segment and the associated data are read until the indicated end point is reached. Next, if the mining machine is to be provided with driving specifications at more frequent intervals than allowed by the points stored in the memory, additional points may be formed between the points by interpolation in step 8, and in step 9 the data relating to the points may be specified by copying data from an original segment point to adjacent, interpolated points.

The route relating to the mining machine's task being thus determined, the mining machine, guided by its own control equipment, travels along the route as determined in the task, either from its point of departure to the end point or continuously on the assigned route, either back and forth or in one direction on a closed route, for example. Since the segments are in practice determined in relatively real-time, it is possible that when the first point has been determined the mining machine starts off to its route to accomplish its task, forming, at the same time as it moves, the route using the parameters in its memory.

Figure 2:
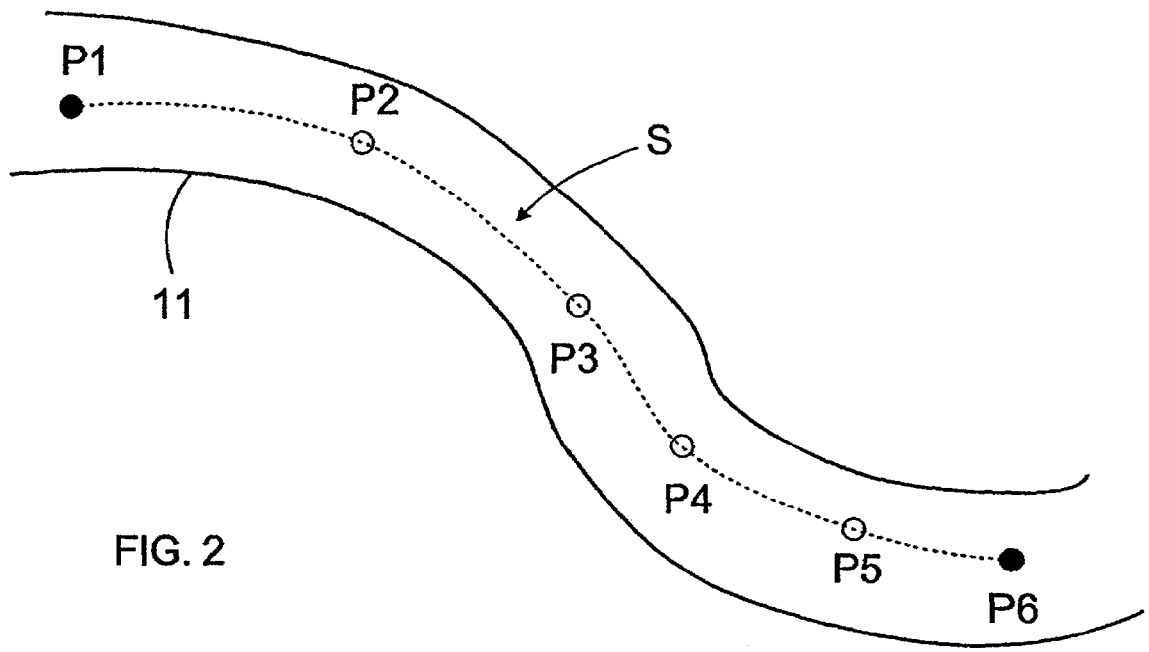
FIG. 2 is a schematic illustration of a route segment and the associated control points.

FIG. 2 is a schematic illustration of a structure of a segment. Segment S has six points, by way of example, of which points P1 and P6 are the end points of segment S. Each one of these points is provided with perpendicular directions x and y determined in a specific coordinate system fixed in relation to the earth. It is thus possible to express at each point for example a direction to be taken at that point, given as x and y coordinates, and the either general or possibly vehicle-specific allowed maximum speed. These data can be used for determining in which direction and at what speed the mining machine is allowed to move at that point. In addition, a gear precisely suitable for each mining machine, the position of a boom or lever arm possibly included in the machine, and the position of a bucket, if any, may be determined. These data naturally depend on the fixtures of the mining machine in question, so naturally they are not relevant to all mining machines.

Figure 3:
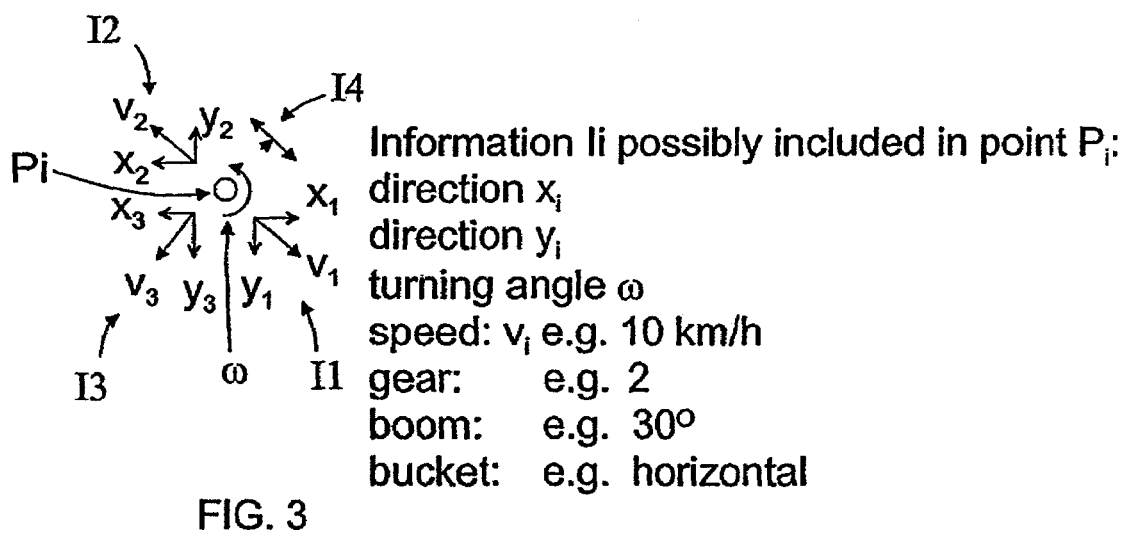
FIG. 3 is a schematic illustration of a route point in a route segment and data associated, by way of example, therewith.

FIG. 3 is a schematic illustration of one route point of a route segment and data associated, by way of example, therewith.

The Figure shows one route point Pi, given as an example, which may be either an end point of a segment or an intermediate segment point. Different data, some which are schematically shown, may be associated with point Pi. Ii represents schematically the information content of point Pi, showing the location of point Pi in a rectangular coordinate system. Location values are expressed as vectors or numeral values $x_i$ and $y_i$ on coordinate axes x and y. FIG. 3 further shows a turning angle $\omega$, which expresses the angle of turn required to a specific direction to allow the mining machine to continue its travel. In addition to these data, information Ii relating to the point in question may show for example the gear to be selected from the gear system of a particular mining machine of a particular type, such as gear 2 for a loader in the case illustrated by FIG. 3, the angle of inclination or some other position of a boom possibly belonging to the mining machine, or the position of a bucket attached to the boom, such as "horizontal" for a bucket in a mining machine, and any other data that have an impact on the movement of the mining machine and the guidance thereof via route point Pi to a particular direction.

In the simplest case only the position of a segment in the coordinate system is determined. In that case the control equipment of the mining machine uses the software included therein to calculate a route conveniently running or curving between successive route points by applying a suitable mathematical calculation model to provide a curve running through successive points, for example. In an equally simple alternative the mining machine may be provided with a speed setting adjusted to the above curvature and possibly with a maximum speed, so that when the calculated curvature increases, i.e. the radius becomes smaller, the speed of the mining machine correspondingly drops in a certain, predetermined proportion to the radius of curvature. Other parameters can be determined according to need. Similarly, the calculation of track curvature in junctions and other locations requiring a sharp turn is determined such that the curvature does not exceed the greatest possible turning angle of the mining machine.

Figure 4:
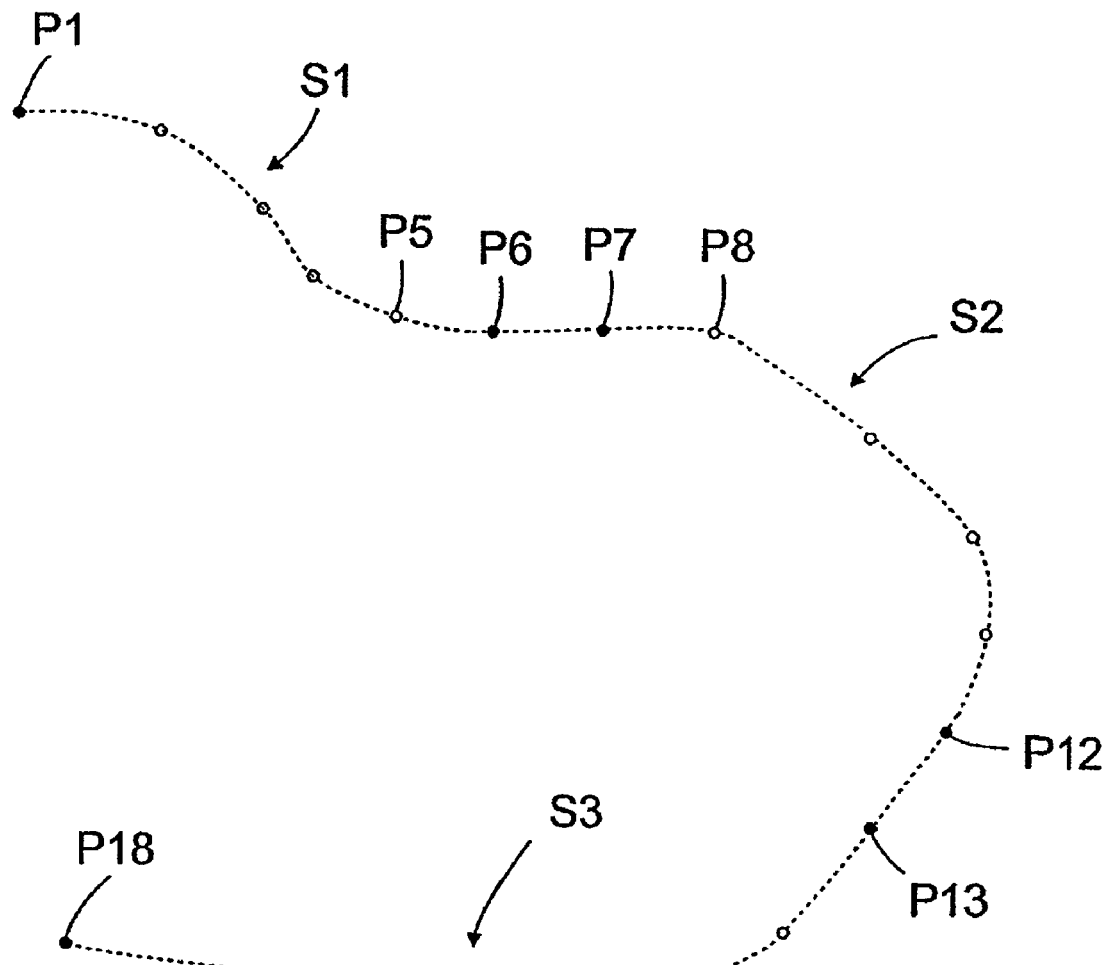
FIG. 4 is a schematic illustration of a route formed of successive segments.

FIG. 4 is a schematic illustration of a mining machine route formed of successive segments. Each segment comprises a set of points whose characteristics and parameters in relation to the operation of the mining machine have been determined. Successive segments may join each other at the end points thereof and thus have one common point. The situation shown in FIG. 4, however, represents a simple and preferred embodiment in which the distance between the end points of each segment is approximately the same as the distance from these end points to the nearest route point in the same segment. FIG. 4 thus shows a case in which segment S1 is between points P1 and P6 and segment S2, in turn, between points P7 and P12. The distance between end points P6 and P7 is approximately of the same order as the distance from end points P6 and P7 to the nearest point in the same segment, i.e. the distance between points P5 and P6 and between points P7 and P8, respectively. FIG. 4 schematically illustrates three successive segments S1 to S3 formed by points P1 to P18, the segments together forming a uniform route. In the simplest case the segments are determined so that they do not share common points, but the distance between the extreme points of successive or interconnected segments is most preferably equal to the distance between adjacent points in one and the same segment. Naturally this distance may vary considerably, depending on circumstances, but operation between successive or interconnected segments and the calculation of the route takes place in the same way as between successive route points of one and the same segment.

Figure 5:
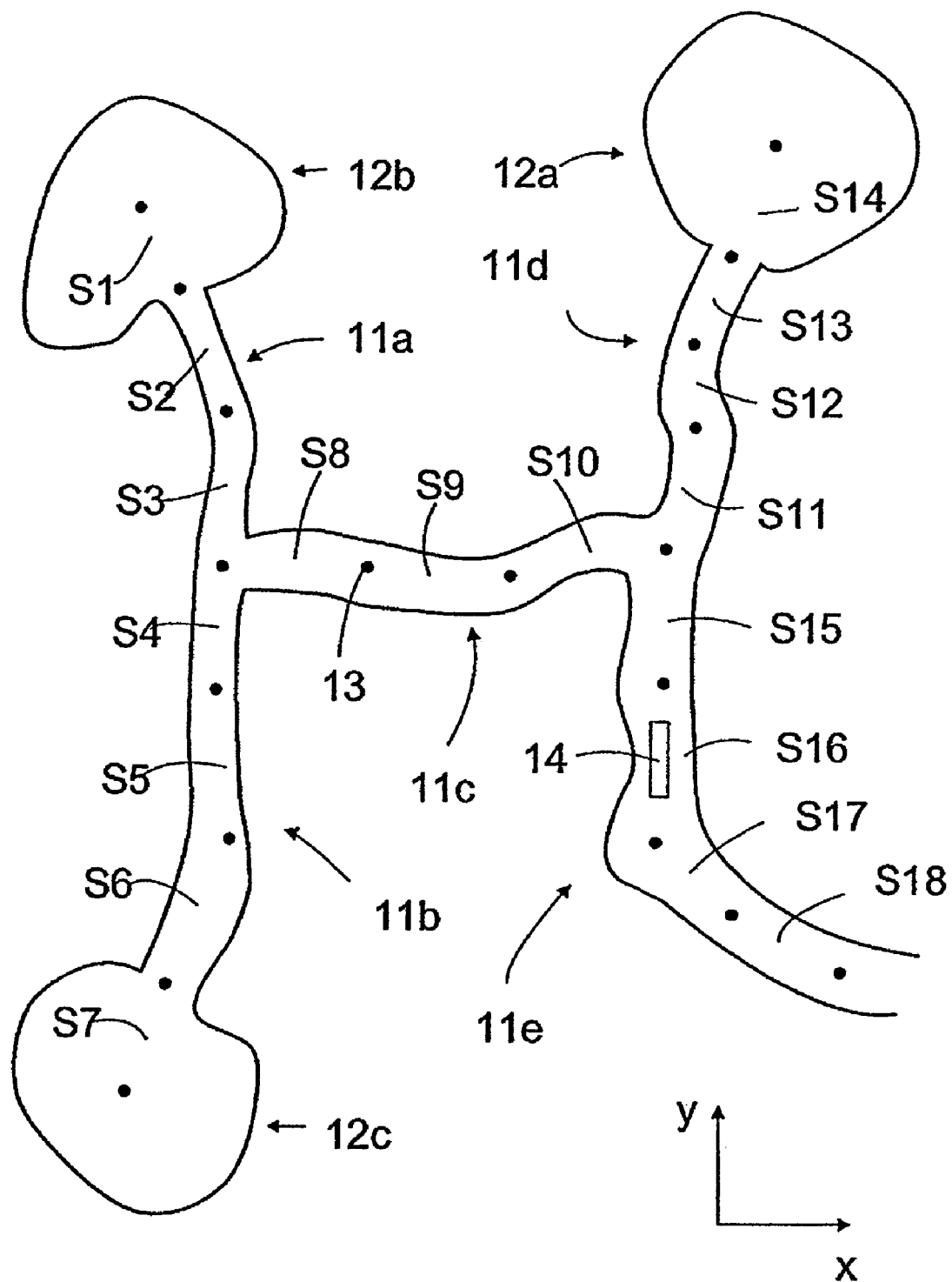
FIG. 5 is a schematic illustration of some mine passages, where the invention is applied.

FIG. 5 is a schematic illustration of part of a mine tunnel in which the method of the invention can be applied. It shows a mine tunnel 11 comprising a number of different sections 11a to 11e. At the end of some tunnel sections there is a loading or a discharge site 12a to 12c. The tunnel sections 11a to 11e are each provided with points 13 to schematically indicate the end point of segments Si (i=1–n; n being an integer). The Figure further shows a coordinate system of x and y coordinates fixedly determined in relation to the mine.

When located at the point shown in FIG. 5, the unmanned mining machine 14 automatically guided by the control system receives a command to move from its current location to the loading site 12a and to start transferring material from the loading site 12a to the discharge site 12b. In this situation the route assigned to the mining machine consists of segments S1 to S3 and S8 to S14. Further, segments S16 and S15 have been determined as connecting routes to allow the mining machine to move to the determined route to perform the assigned task.

In this situation the control unit of the mining machine 14 determines on the basis of its current location the nearest point in segment S16 and then begins to read points of segments S15 and S11 to S14 from that onwards into its memory, as shown in FIG. 1, until a route terminating at the loading point of the loading site 12a has been determined. When the first points have been determined, the mining machine 14 can begin to move towards the loading site 12a, continuing, at the same time, to store in its control unit data on segments S1 to S3 and S8 to S10 of the route relating to its task. Since the data of segments S11 to S14 are already entered in the first step, they do need to be entered again. When the mining machine 14, i.e. the loader used here as an example, has reached the loading site 12a, it fills its bucket according to the instructions it has received and follows its task route in a reverse order from S14 to S8 and from S3 to S1 to the discharge site 12b, where it discharges the load of the bucket. If included in the assignment, the mining machine 14 then travels the route in opposite direction to return to the loading site 12a. Normally the mining machine carries out only one task at a time and receives a separate assignment for each task from the control system of the mine. However, in some cases the mining machine may be given a single assignment containing a task that is to be repeated a plural number of times, in which case the mining machine 14 repeats the task until it receives new instructions.

When moving along its route, the mining machine must always know its location precisely. For this purpose, it is provided with positioning means that continuously measure its location. Such positioning means may include different distance gauges, devices measuring travel direction and/or steering angle, different equipment for scanning the environment to determine location on the basis of data, such as a wall profile, obtained by the scanning. All these data serve for checking that the mining machine is where it should be in order to be able to operate and move according to the determined segments.

Figure 6:
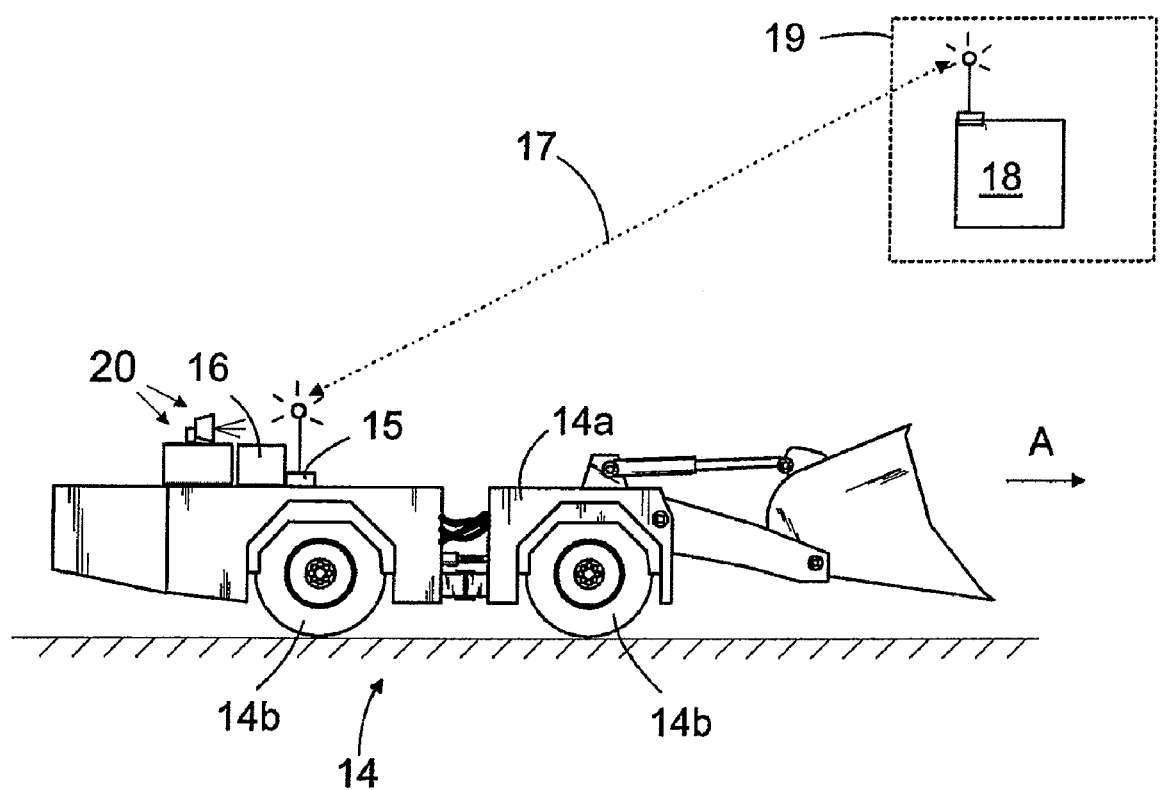
FIG. 6 is a schematic illustration of equipment for implementing the invention.

FIG. 6 shows a mining machine 14, a loader in this case, provided with a bucket at its front part for carrying and loading excavated material. Alternatively, the mining machine 14 may be a rock drilling rig or a transport vehicle provided with a platform, for example. The mining machine 14 comprises a movable carrier 14a, which is usually provided with a number of wheels 14b on which it moves. Such mining machines are commonly known per se and therefore they need not be described in greater detail here. In addition, this type of mining machine 14 that preferably operates without an operator is provided with a control system including at least a control unit 15, which is arranged to control the actuators of the mining machine 14 for steering and operating the vehicle.

Further, the mining machine 14 has a data transfer unit 19 with which the control unit 15 may set up a data transfer connection 17 to control equipment 18 external to the mining machine 14. The control equipment 18 forms a part of an overall control system 19 of the mine used for guiding unmanned, automatically moving mining vehicles 14. The control unit 15, the control equipment 18, and the control system 19 of the mine usually contain also computers or similar devices. In addition, the control system of the mining machine 14 contains other measuring and control devices 20 allowing the direction and location of the vehicle to be determined for precise positioning. Further, the control system comprises means for determining the distance travelled by the mining machine 14. Such means for determining location and distance are also commonly known per se and therefore they do not need to be described in greater detail here.

The drawings and the related specification are only meant to illustrate the inventive idea. The details of the invention may vary within the scope of the claims.

The invention claimed is:

1. A method for automatically guiding a mining machine, comprising the steps of:
    determining a route for a mining machine that is to perform a task, the route being determined in a coordinate system fixedly determined in relation to the mine, whereby the route is determined in the coordinate system as interconnected segments representing the route, each segment is determined as successive points located at a distance from one another, at least the location of each segment with a specific identifier code is determined and stored by a control system of the mine;
    storing in the memory of the mining machine data about the segments and the associated route points;
    supplying the data about the route to the mining machine by giving the identifier codes of the segments belonging to the route;
    transmitting list of identifier codes of the segments relating to the route from the control system of the mine to control equipment of the mining machine;
    storing the information of the segments to control equipment of the mining machine;
    determining the route of the mining machine on the basis of the identifier codes and the route point data stored in its memory;
    guiding the machine to complete the route determined by the segments; and
    controlling the mining machine with the control system of the mining machine by adjusting the mining machine according to data associated with the next route point or segment.

2. A method according to claim 1, wherein the current location of the mining machine in the route is measured with separate measuring devices belonging to the control equipment of the mining machine, the measuring devices including gauges for measuring the traveled distance on the basis of the measured rolling of the wheels and direction in which the machine is guided to.

3. A method according to claim 1, wherein the current location of the mining machine on the route is further measured by means of separate scanners belonging to the control equipment of the mining machine and measuring the wall profile, and that the location data thus obtained is used, when necessary, for correcting the location data of the mining machine.

4. A method according to claim 1, wherein additional route points setting between the segment route points are determined and that the information relating to the additional route points is generated according to predetermined rules on the basis of the information on the existing route points.

5. A method according to claim 1, wherein one parameter determining the operation of the mining machine is the maximum allowed speed and that the control equipment of the mining machine determines the speed of the machine on the basis of a target speed set for the machine, taking into account maximum speeds determined in relation to the curvature of the route.

6. A method according to claim 1, wherein the speed of the mining machine is slowed down in advance as it approaches the last known route point.

7. A method according to claim 6, wherein the speed of movement of the mining machine is adjusted according to the curvature of the track.

8. A method according to claim 6, wherein the route points contain gearing data of the mining machine and that on the basis of these data a gear suitable to the speed of the mining machine is selected from the gear system.

9. A method according to claim 1, wherein the position of one of the mining machine actuators is determined in relation to at least some of the route points and that the control equipment of the mining machine controls the actuator according to the position data provided.

* * * * *